United States Patent [19]

Poll et al.

[11] Patent Number: 5,258,470
[45] Date of Patent: Nov. 2, 1993

[54] MOLDING COMPOUNDS BASED ON AROMATIC POLYAMIDES

[75] Inventors: Günter Poll; Jürgen Finke; Horst Beyer, all of Marl; Harald Modler, Bochum, all of Fed. Rep. of Germany

[73] Assignee: Hüls Aktiengesellschaft, Marl, Fed. Rep. of Germany

[21] Appl. No.: 889,282

[22] Filed: May 28, 1992

[30] Foreign Application Priority Data

Jun. 12, 1991 [DE] Fed. Rep. of Germany ....... 4119301

[51] Int. Cl.$^5$ .............................................. C08L 77/10
[52] U.S. Cl. ...................... 525/425; 525/432; 525/420
[58] Field of Search ................. 525/420, 425, 432

[56] References Cited

U.S. PATENT DOCUMENTS

| 4,438,236 | 3/1984 | Cogswell et al. | 525/165 |
| 4,728,698 | 3/1988 | Isayev et al. | 525/439 |
| 4,749,768 | 6/1988 | Finke et al. | 528/172 |
| 4,847,333 | 7/1989 | Lubowitz et al. | 525/432 |
| 4,952,662 | 8/1990 | Finke et al. | 528/182 |

FOREIGN PATENT DOCUMENTS 0087831 9/1983 European Pat. Off. .
0237722 9/1987 European Pat. Off. .
0359037 3/1990 European Pat. Off. .
3216413 11/1983 Fed. Rep. of Germany .

OTHER PUBLICATIONS

Hawley's Chemical Dictionary, 11th Ed., Van Nostrad, N.Y., 1987 pp. 301-302.

Primary Examiner—Joseph L. Schofer
Assistant Examiner—Mark Nagumo
Attorney, Agent, or Firm—Oblon, Spivak, McClelland, Maier & Neustadt

[57] ABSTRACT

An aromatic polyamide molding compound, comprising:

I. an aromatic polyamide having the basic structure

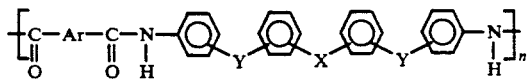

where Ar is an aromatic radical without amine-reactive functional groups
n is a number between 5 and 500; X represents —SO$_2$— or —CO—, and
Y represents —O— or —S—; and
II. an aromatic liquid crystalline thermoplastic.

6 Claims, No Drawings

MOLDING COMPOUNDS BASED ON AROMATIC POLYAMIDES

BACKGROUND OF THE INVENTION

1. Field of the Invention:

The present invention relates to molding compounds based on aromatic polyamides.

2. Description of the Background:

The preparation of aromatic polyamides having the basic structure

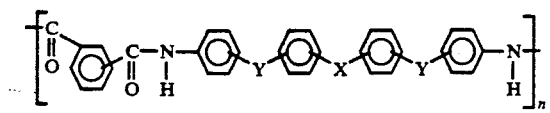

is known (Ger. OS 36 09 011). However, these aromatic polyamides have a high melt viscosity. Therefore in the manufacturing and processing of such compounds, one must employ high temperatures, generally at least 350° C. At these temperatures the product often suffers damage, as evidenced by discoloration of the polymer or by inferior mechanical properties. A need continues to exist for aromatic polyamides of improved mechanical properties.

SUMMARY OF THE INVENTION

Accordingly, one object of the present invention is to provide aromatic polyamide compound of improved characteristics, particularly improved mechanical properties.

Briefly, this object and other objects of the invention as hereinafter will become more readily apparent can be attained by an aromatic polyamide compound comprised of (I) an aromatic polyamide having the structure:

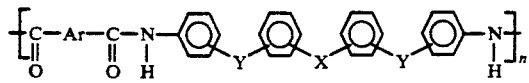

where Ar is an aromatic radical without amine-reactive functional groups n is a number between 5 and 500; X represents —SO— or —CO—, and Y represents 13 O— or —S—; and (II) an aromatic, liquid crystalline thermoplastic.

DETAILED DESCRIPTION OF THE INVENTION

Preferred molding compound embodiments of the invention have a ratio by weight of component I to component II in the range 99:1 to 50:50, preferably in the range 98:2 to 60:40.

The polyamide (component I) is formed from an aromatic dicarboxylic acid such as isophthalic acid, terephthalic acid, 1,4-, 1,5-, 2,6-, or 2,7-naphthalenedicarboxylic acid, 4,4'-diphenylether dicarboxylic acid, 4,4'-benzophenonedicarboxylic acid, 4,4'-diphenylsulfone dicarboxylic acid, 2-phenoxyterephthalic acid, 4,4'-biphenyldicarboxylic acid, mixtures of these, and the like. Preferred is isophthalic acid alone or a mixture of isophthalic acid and another one of the abovementioned acids. In the case of a mixture, up to 45 mol % of the isophthalic acid is replaced.

Suitable aromatic diamine reactants include, e.g., 4,4'-bis(4-aminophenoxy)diphenylsulfone, 4,4'-bis(3-aminophenoxy)diphenylsulfone, 4,4'-bis(4-aminophenoxy)benzophenone, 4,4'-bis(3-aminophenoxy)benzophenone, 4,4'-bis(p-aminophenylmercapto)benzophenone, 4,4'-bis(p-aminophenylmercapto)diphenyl sulfone mixtures thereof, and the like. The preferred diamine is 4,4'-bis(4-aminophenoxy)diphenylsulfone.

The molar ratio of dicarboxylic acid to diamine employed is in the range of c. 0.9:1 to 1:0.9.

In order to impart improved hydrolysis resistance to the aromatic polyamide (component I), an additional low molecular weight aliphatic, araliphatic, or aromatic carboxylic acid amide in an amount of 0.0–10 mol %, based on the sum of the dicarboxylic acid and the diamine, is added to the acid reactant. The aromatic group here may contain halogen substituents or $C_1$–$C_4$ alkyl group substituents. These measures are described in Ger. OS 38 04 401.

The hydrolysis resistance of the polyamide can also be improved by employing the dicarboxylic acid in slight excess (Ger. OS 39 35 467), or, with the dicarboxylic acid and diamine present in approximately equimolar amounts, by further adding a monocarboxylic acid (Ger. OS 39 35 468).

The basic method of manufacturing aromatic polyamides is known. It is described, among other places, in Ger. OS 36 09 011.

Preferably a phosphorus-containing catalyst is employed in the manufacture of the aromatic polyamides. Suitable catalysts include, particularly, acids of the formula: $H_3PO_a$, Where $a=2$ to 4, or derivatives of such acids. Preferred catalysts include, in particular, phosphoric acid, phosphorous acid, hypophosphorous acid, phosphonic acids such as methanephosphonic acid and phenylphosphonic acid, phosphonous acids such as benzenephosphonous acid, and phosphinic acids such as diphenylphosphinic acid. Salts of the acids may be employed instead of the pure acids. Suitable cations include alkali metals and alkaline earth metals, zinc, and others.

The catalyst is employed in the amount of 0.01–4.0 mol %, preferably 0.2–2.0 mol % based on the sum of the dicarboxylic acid and the diamine.

A preferred method for manufacturing the aromatic polyamides is to employ dialkylaminopyridines as co-catalysts along with the catalyst. Particularly suitable dialkylaminopyridines are those with 1–10 C atoms in the alkyl group. Preferably, 4-dimethylaminopyridine, 4-dibutylaminopyridine, or 4-piperidinylpyridine, and derivatives of these compounds in which a pyrrolidine or piperidine ring is formed with the amine nitrogen atom of a compound.

If a co-catalyst is employed, the amount used ranges from 0.05–4 mol %, preferably 0.2–2 mol % based on the sum of the dicarboxylic acid and the diamine. It is particularly preferred to use the co-catalyst in an amount equivalent to that of the catalyst in the reaction mixture. The reaction is carried out as a melt, at temperatures in the range 200°–400° C., preferably 230°–360° C.

Ordinarily, an inert gas atmosphere is used, in the reaction under pressure. Less than atmospheric and superatmospheric pressures may be employed, however.

In order to increase the molecular weight, the aromatic polyamide can be subjected to a solid phase postcondensation, reaction also in an inert gas atmosphere.

The glass temperature (Tg) of the aromatic polyamides is in the range of 190°-270° C. The viscosity index (J-value) is c. 30-150 cc/g, preferably 60-120 cc/g. The melt viscosity index (MVI) is 0.1-200 cc/10 min, preferably 1.0-60 cc/10 min.

Aromatic, liquid crystalline thermoplastics (component II) are basically known. A definition of the "liquid crystalline" property is presented in *Polymer*, 31, 1990, 979 ff., or *Kunststoffe*, 80, 1990, 1159 ff. The principal liquid crystalline materials which may be used are aromatic polyesters and polyester amides. However, other thermoplastics which have liquid crystalline properties are suitable.

The preferred aromatic liquid crystalline polyesters and polyester amides are comprised of units of dicarboxylic acids, dihydroxycompounds, diamines, hydroxy- and/or aminocarboxylic acids, or aminophenols.

Suitable (di)carboxylic acids include, e.g., terephthalic acid, isophthalic acid, 1,4- or 2,6-naphthalenedicarboxylic acid, 4,4'-diphenylether dicarboxylic acid, 4,4'-dicarboxydiphenylsulfone, p-hydroxybenzoic acid, 6-hydroxy-2-naphthalenecarboxylic acid, 3- or 4-aminobenzoic acid, and the like.

Suitable dihydroxy compounds include, e.g., hydroquinone, resorcinol, 4,4'-dihydroxybiphenyl, 4,4'-dihydroxydiphenylsulfone (bisphenol S), 4,4'-dihydroxydiphenylsulfide (bisphenol T), 4,4'-dihydroxybenzophenone, and 1,4- or 2,6-dihydroxynaphthalene, and the like.

Suitable amino compounds include, e.g., 3- or 4-aminophenol, 3- or 4-aminobenzoic acid, 1,3- or 1,4-diaminobenzene, and the like.

Particularly suitable aromatic liquid crystalline thermoplastics are described in Eur. OSs 0,063,680, 0,081,900; 0,102,160; 0,134,956; 0,170,935; 0,201,831; 0,205,855; and 0,257,558; and in U.S. Pat. Nos. 3,778,410; 3,380,485, and 4,574,066. These patent documents include disclosures of methods of synthesis and compositions.

The liquid crystalline thermoplastics have the additional characteristic among other characteristics that their MVI at 380° C. and 10 kp load is in the range 5-200 cc/10 min (DIN 53 35-B).

Suitable aromatic liquid crystalline thermoplastics should have the following properties:
melting point in the range 250°-330° C.;
thermal stability up to 400° C., preferably 350° C.;
have a liquid crystalline phase in the processing range of the molding compound;
incompatibility with component I.

The incompatibility is characterized by phase separation of the aromatic polyamide and the liquid crystalline thermoplastic in the temperature range −273° to +400° C. The diameter of the phase regions of the liquid crystalline thermoplastics is at least 0.05 micron.

Components I and II may be mixed in customary apparatus, by injection molding or extrusion, and may be processed in customary apparatus to form molding compounds.

The molding compounds may also contain fillers, e.g. talc, or reinforcing materials, e.g. fibers of glass, Aramid ®, or carbon, as well as other customary additives such as, e.g., pigments and stabilizers.

The inventive molding compounds can be processed to produce molded parts, fibers, sheets, films, and the like, by the usual processes such as injection molding, extrusion, and the like. It is also possible to use the materials as coatings based on a powder, e.g. by whirl sintering techniques, a liquid dispersion, or a solution.

It has been found that the present molding compounds have clearly better processibility than the aromatic polyamides alone (component I), i.e. they have lower melt viscosity; and that they offer an improved set of mechanical properties, in critically important aspects.

Having generally described this invention, a further understanding can be obtained by reference to certain specific examples which are provided herein for purposes of illustration only and are not intended to be limiting unless otherwise specified.

The parameters referred to in the Examples and elsewhere herein were determined by the following methods: The glass point (Tg) and melting point (Tm) were determined by the use of a DSC (differential scanning calorimeter) (Mettler TA 3000), with a heating rate 20° C. per minute.

The viscosity index (J) was determined using 0.5 wt. % solutions of the polyamides in a 1:1 (by wt.) phenol-/o-dichloro-benzene mixture at 25° C. (DIN 53 728).

The melt viscosity index (MVI) was determined on a Goettfert viscosimeter at 320° C. and 21.6 kp load, according to DIN 53 735-B.

The bending modulus E was determined according to DIN 53 547-B 3, the tensile modulus E according to DIN 53 547-t, the flexural strength according to DIN 53 452, and the tensile strength according to DIN 53 455.

Example A is a comparison example.

EXAMPLES

Example A (according to Example 1 of Ger. OS 36 09 011)

A 21.62 g (0.05 mol) amount 4,4'-bis(4-aminophenoxy)diphenylsulfone and 8.31 g (0.05 mol) isophthalic acid were melted in the presence of 109 microliter (0.001 mol) 50% aqueous hypophosphorous acid and 122 mg (0.001 mol) 4-dimethylaminopyridine, in a polycondensation reactor with stirrer, nitrogen inlet, and distillation bridge, at 250° C. After 20 min the temperature was increased to 300° C. The viscosity increased constantly. Water liberated during the course of the reaction was removed by distillation. After 30 min at 300° C. the reaction wa terminated. The viscosity index (J) was 35 cc/g. Twenty-four hours of solid phase post-condensation reaction at 250° C. and 0.5 mbar gave a polyamide with J-value 75 cc/g.

Tg=250° C. MVI=5.3 cc/10 min.

EXAMPLE 1

39.6 g amount of the aromatic polyamide according to Example A and 0.4 g of a commercially available liquid crystalline polyester amide (Vectra ® B 950 polyester amide based on p-hydroxybenzoic acid, 2,6-hydroxynaphthalenedicarboxylic acid, and p-aminobenzoic acid, with MVI=258 g/10 min at 300° C. and 2.16 kp load) were intermixed in a laboratory kneader (supplied by Haake) for 15 min at 320° C. under nitrogen. An opaque blend was obtained.

J-value=54 cc/g. Tg=251° C. MVI=7.3 cc/10 min.

Examples 2-6

Examples 2-6 were carried out analogously to Example 1, but the ratio of the aromatic polyamide to the liquid crystalline polyester amide in each mixture was varied. The proportions of the individual components and the properties of the resulting molding compounds are shown in Table 1.

| Example | PA* (wt %) | PEA** (wt %) | J-value (cm³/g) | MVI-value (cm³/10 min) | $T_g$ (°C.) | $T_m$ (°C.) |
|---|---|---|---|---|---|---|
| 1 | 99 | 1 | 54 | 7.3 | 251 | — |
| 2 | 97 | 3 | 51 | 7.7 | 252 | — |
| 3 | 95 | 5 | 51 | 15.9 | 248 | — |
| 4 | 90 | 10 | 55 | 19.4 | 249 | 283 |
| 5 | 80 | 20 | 60 | 64.1 | 248 | 281 |
| 6 | 70 | 30 | 53 | 126 | 253 | 283 |
| A | 100 | 0 | 75 | 5.3 | 250 | — |

PA* - Aromatic polyamide
PEA* - Liquid crystalline polyester amide.

Example 7

A molten mixture comprised of 95 parts by weight (pbw) aromatic polyamide according to Example A and 5 pbw liquid crystalline polyester amide according to Example 1 was prepared in a dual-screw kneader (type ZE 25 supplied by Berstorff) at a housing temperature of 330° C., screw speed of 70 rpm, and a throughput of 3 kg/hr. The resulting granular product was processed to form test bodies which had the following properties.

TABLE 2

|  | Example 7 | Example A |
|---|---|---|
| J-Value (cm³/g) | 75 | 62 |
| MVI-Value (cm³/10 min) | 15.9 | 5.2 |
| Bonding E-Modulus (N/mm²) | 3 950 | 3 400 |
| Tensile Strength (N/mm²) | 3 330 | 3 000 |
| Tensile E-Modulus (N/mm²) | 83 | 69 |
| Flexural Strength (N/mm²) | 178 | 168 |

Having generally described this invention, a further understanding can be obtained by reference to certain specific examples which are provided herein for purposes of illustration only and are not intended to be limiting unless otherwise specified.

What is claimed as new and desired to be secured by Letters Patent of the United States is:

1. An aromatic polyamide molding composition, comprising:
   I. an aromatic polyamide having the basic structure

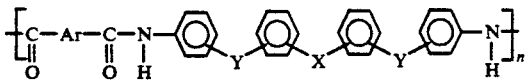

wherein
   Ar is an aromatic radical without amine-reactive functional groups
   n is a number ranging from 5 to 500, X is —$SO_2$— or —CO—, and Y is —O— or —S—; and
   II. an aromatic liquid crystalline thermoplastic having a melting point in the range of 250°–330° C., a thermal stability up to 400° C., a liquid crystalline phase in the processing range of the molding composition and an incompatability with Component I, which incompatibility is defined as a phase separation of the aromatic polyamide and the thermoplastic in the temperature range of 273° to 400° C.

2. The molding composition according to claim 1, wherein the ratio by weight of component I to component II is in the range of 99:1 to 50:50.

3. The molding composition according to claim 1, wherein the ratio by weight of component I to component II is in the range of 98:2 to 60:40.

4. The molding composition according to claim 1, wherein the aromatic liquid crystalline thermoplastic is a polyester or a polyester amide.

5. The molding composition according to claim 1, wherein in the preparation of the aromatic polyamide component I, the molar ratio of reacting dicarboxylic acid to diamine ranges from 0.9:1 to 1:0.9.

6. The molding composition according to claim 1, wherein in the reaction between dicarboxylic acid and diamine to form the aromatic polyamide, from 0.01 to 10 mol % of low molecular weight aliphatic, araliphatic or aromatic carboxylic acid amide is added to the acid reactant.

* * * * *